United States Patent
Ding

(10) Patent No.: US 12,553,108 B2
(45) Date of Patent: Feb. 17, 2026

(54) PROCESSES FOR EXTRACTING METALS FROM LITHIUM-ION BATTERIES

(71) Applicant: Albemarle Corporation, Charlotte, NC (US)

(72) Inventor: Nan Ding, Charlotte, NC (US)

(73) Assignee: Albemarle Corporation, Charlotte, NC (US)

( * ) Notice: Subject to any disclaimer, the term of this patent is extended or adjusted under 35 U.S.C. 154(b) by 909 days.

(21) Appl. No.: 17/286,289

(22) PCT Filed: Oct. 25, 2019

(86) PCT No.: PCT/US2019/058074
§ 371 (c)(1),
(2) Date: Apr. 16, 2021

(87) PCT Pub. No.: WO2020/092157
PCT Pub. Date: May 7, 2020

(65) Prior Publication Data
US 2021/0395859 A1    Dec. 23, 2021

Related U.S. Application Data

(60) Provisional application No. 62/752,689, filed on Oct. 30, 2018.

(51) Int. Cl.
| | | |
|---|---|---|
| C22B 26/12 | (2006.01) | |
| C22B 3/00 | (2006.01) | |
| C22B 3/08 | (2006.01) | |
| C22B 3/44 | (2006.01) | |
| C22B 7/00 | (2006.01) | |

(52) U.S. Cl.
CPC ............... *C22B 26/12* (2013.01); *C22B 3/08* (2013.01); *C22B 3/44* (2013.01); *C22B 7/007* (2013.01); *C22B 23/043* (2013.01)

(58) Field of Classification Search
None
See application file for complete search history.

(56) References Cited

U.S. PATENT DOCUMENTS

2017/0170532 A1    6/2017    Blais et al.

FOREIGN PATENT DOCUMENTS

| | | | |
|---|---|---|---|
| AU | 2001261915 A1 | * | 5/2003 |
| CN | 101509071 A | | 8/2009 |
| CN | 101942569 A | | 1/2011 |
| CN | 101942589 | * | 1/2011 |
| CN | 103956534 A | | 7/2014 |
| CN | 107117661 | * | 9/2017 |
| CN | 107117661 A | | 9/2017 |
| CN | 107406251 | * | 11/2017 |
| CN | 107475538 A | | 12/2017 |
| CN | 108314086 | * | 7/2018 |
| EP | 1760821 A1 | | 3/2007 |
| JP | 2007122885 A | | 5/2007 |
| JP | 2016069706 A | | 5/2016 |
| KR | 1020150094412 A | | 8/2015 |
| WO | 2014/042136 A1 | | 3/2014 |
| WO | 2014/154152 A1 | | 10/2014 |
| WO | WO2018163012 | * | 9/2018 |
| WO | 2018/192121 A1 | | 10/2018 |

OTHER PUBLICATIONS

Perdue University. Bodner Research Web. predict the metal forms that would be extracted. It would not be considered obvious that Fe(II) and Mn(II) would be leached from the process because Tan and Lui are not, in fact, performing the same process as the claims. 2024 (Year: 2024).*

Korean Office Action for KR Application No. 10-2021-7011281, issued Oct. 15, 2024, 8 pages.

* cited by examiner

Primary Examiner — Sheng H Davis
(74) Attorney, Agent, or Firm — KDW Firm PLLC

(57) ABSTRACT

Processes are described for extracting metals from a combination derived from spent lithium-ion batteries and comprising such metals, a liquid, an acid, and other components.

5 Claims, 3 Drawing Sheets

PROCESSES FOR EXTRACTING METALS FROM LITHIUM-ION BATTERIES

CROSS-REFERENCE TO RELATED APPLICATIONS

This application is a National Stage of International Application No. PCT/US2019/058074, filed on Oct. 25, 2019, which claims the benefit of U.S. Provisional Patent Application No. 62/752,689, filed on Oct. 30, 2018. Each patent application identified above is incorporated here by reference in its entirety.

FIELD

The present disclosure generally relates to one or more processes for extracting one or more metals from lithium-ion batteries.

BACKGROUND

This section introduces information that may be related to or provide context for some aspects of the techniques described herein and/or claimed below. This information is background facilitating a better understanding of that which is disclosed herein. Such background may include a discussion of "related" art. That such art is related in no way implies that it is also "prior" art. The related art may or may not be prior art. The discussion is to be read in this light, and not as admissions of prior art.

The cathode active material (CAM) in lithium-ion batteries (LIBs) contains lithium (Li) and cobalt (Co), both of which are in demand, in particular, due to their application in e-mobility.

Spent LIBs can be recycled via a physical process involving shredding, sieving and magnetic separation. The CAM, along with graphite from the anode, ends up in a fine fraction often referred to as "black mass." Due to the nature of the physical process, there are many impurities in the black mass. The most common ones are copper and aluminum from the current collectors, iron from the battery casing, and phosphorous probably from the remaining or decomposed electrolyte.

In typical hydrometallurgical processes for recovering valuable metals from the black mass, acid leaching is the first step. Typically, sulfuric acid ($H_2SO_4$) and hydrogen peroxide ($H_2O_2$) are used in this step to generate a solution that is rich in Li and Co. The function of $H_2O_2$ is to reduce Co(III) in the CAM to Co(II), which is more soluble in an acidic solution. However, $H_2O_2$ can behave either as a reducing agent or an oxidizing one, depending on the chemical potentials of the redox pairs. This creates problems of unnecessarily bringing impurities along with the metals of interest. For example, copper (Cu) and phosphorus (P) both enter the solution along with $Li^+$ and $Co^{2+}$ when $H_2O_2$ is used, therefore additional purification steps are typically needed to remove these elements.

Thus, there is a need for one or more improved processes for acid leaching for use in hydro-metallurgical processes for recovering valuable metals from the black mass. In particular, there is a need for one or more improved processes for acid leaching that are less prone to carry impurities along with the metals of interest than are known process. Further, improved processes for LIB recycling are needed.

SUMMARY

In general, the present disclosure provides one or more processes for extracting one or more metals from one or more lithium ion batteries.

In an aspect, a process is provided that comprises (A) preparing a mass from one or more lithium ion batteries, wherein the mass comprises one or more selected from the group consisting of lithium, cobalt, nickel, manganese, iron, aluminum, and any combination of two or more of the foregoing; (B) contacting the mass with an acid to form a combination; (C) contacting the combination with a reducing agent so as to form an acid leachate, wherein the reducing agent comprises sodium thiosulfate; (D) adjusting the pH of the acid leachate so as to form a precipitate comprising aluminum; and (E) extracting from the acid leachate one or more selected from the group consisting of lithium, cobalt, nickel, manganese, iron, aluminum, and any combination of two or more of the foregoing.

One or more aspects include the process of any preceding paragraph wherein the pH of the acid leachate is in the range of from about 2 to about 8.

One or more aspects include the process of any preceding paragraph wherein the pH of the acid leachate is in the range of from about 3.5 to about 4.5.

One or more aspects include the process of any preceding paragraph wherein one or more compounds comprising aluminum are extracted from the acid leachate by filtration.

One or more aspects include the process of any preceding paragraph further comprising removing Fe(II) and Mn(II) from the acid leachate by contacting the acid leachate with an oxidizing agent.

One or more aspects include the process of any preceding paragraph wherein the oxidizing agent comprises one or more selected from the group consisting of salts of permanganate anion ($MnO_4^-$), ozone, nitric acid, sulfuric acid, a halogen, perchlorate, chlorite, and any combination of two or more of the foregoing.

One or more aspects include the process of any preceding paragraph wherein in step (E) lithium is extracted from the acid leachate as one or more selected from the group consisting of lithium hydroxide, lithium carbonate, lithium phosphate, lithium sulfate, lithium chloride, lithium nitrate and any combination of two or more of the foregoing.

One or more aspects include the process of any preceding paragraph wherein step (E) cobalt is extracted from the acid leachate as one selected from the group consisting of cobalt sulfate, cobalt chloride, cobalt nitrate, and any combination of two or more of the foregoing.

In another aspect, a process is provided comprising extracting one or more metals are from a combination comprising the one or more metals, a liquid, an acid, and one or more other components, wherein the process comprises (A) adding a reducing agent to the combination, wherein the reducing agent is adapted to reduce a substantial portion of the one or more metals and to have no substantial effect on the one or more other components, and (B) adjusting the pH of the combination so as to form a precipitate comprising aluminum.

One or more aspects include the process of the preceding paragraph wherein the reducing agent comprises sodium thiosulfate.

One or more aspects include the process of the preceding paragraph wherein the pH of the acid leachate is in the range of from about 2 to about 8.

One or more aspects include the process of the preceding paragraph wherein the pH of the acid leachate is in the range of from about 3.5 to about 4.5.

In another aspect, a process is provided that comprises (A) extracting one or more metals from a combination comprising said one or more metals, a liquid, an acid, and one or more other components, wherein the one or more metals and one or more other components are derived from one or more spent lithium ion batteries and the extracting comprises adding a reducing agent comprising sodium thiosulfate to the combination, wherein the reducing agent is adapted to reduce a substantial portion of the one or more metals and to have no substantial effect on the one or more other components, thus producing a leachate comprising Fe(II) and Mn(II); and (B) removing the Fe(II) and the Mn(II) from the leachate by adding an oxidizing agent to the leachate, wherein the oxidizing agent comprises one or more salts of permanganate anion ($MnO_4^-$), ozone, nitric acid, sulfuric acid, a halogen, perchlorate, or chlorite.

One or more aspects include the process of the preceding paragraph wherein in step (A) the pH is in the range of from about 2 to about 8.

One or more aspects include the process of the preceding paragraph wherein in step (A) the pH is in the range of from about 3.5 to about 4.5.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

BRIEF DESCRIPTION OF THE DRAWING(S)

For a detailed description of the preferred embodiments of the disclosed embodiments, reference will now be made to the accompanying drawing(s) in which.

Figure 1:
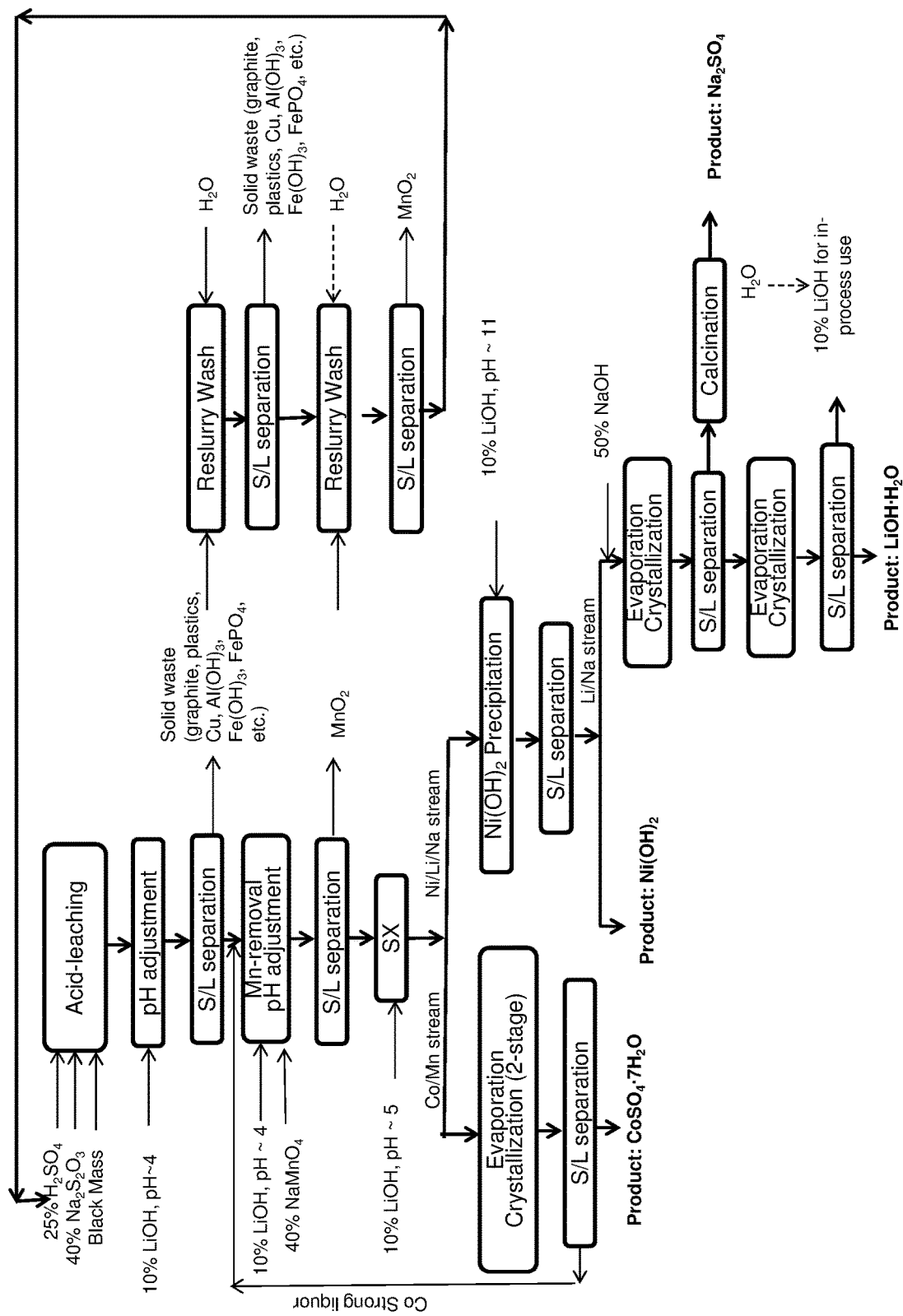
FIG. 1 illustrates a flow chart of an exemplary process for recycling LIBs in accordance with certain aspects of the present disclosure.

While the claimed subject matter is susceptible to various modifications and alternative forms, the drawing(s) illustrate specific embodiments herein described in detail by way of example. It should be understood, however, that the description herein of specific embodiments is not intended to limit the claimed subject matter to the particular forms disclosed, but on the contrary, the intention is to cover all modifications, equivalents, and alternatives falling within the spirit and scope as defined by the appended claims.

Definitions

To more clearly define the terms used in this disclosure, the following definitions are provided. Unless otherwise indicated, the following definitions are applicable to this disclosure. To the extent that any definition or usage provided by any document incorporated here by reference conflicts with the definition or usage provided herein, the definition or usage provided in this disclosure controls.

In this disclosure, features of the subject matter are described such that, within particular aspects, a combination of different features can be envisioned. For each and every aspect and each and every feature disclosed herein, all combinations that do not detrimentally affect the designs, compositions, processes, or methods described herein are contemplated with or without explicit description of the particular combination. Additionally, unless explicitly recited otherwise, any aspect or feature disclosed herein can be combined to describe inventive designs, compositions, processes, or methods consistent with the present disclosure.

In this disclosure, while compositions and processes are often described in terms of "comprising" various components or steps, the compositions and methods can also "consist essentially of" or "consist of" the various components or steps, unless stated otherwise. For example, a process consistent with certain aspects of the disclosed subject matter can comprise; alternatively, can consist essentially of; or alternatively, can consist of; a contacting step and an extraction step.

The terms "a," "an," and "the" are intended to include plural alternatives, e.g., at least one, one or more, and one or more than one, unless otherwise specified. For example, the disclosure of "a solvent," is meant to encompass one, or mixtures or combinations of more than one, solvent, unless otherwise specified.

The terms "room temperature" or "ambient temperature" are used herein to describe any temperature from 15° C. to 40° C. wherein no external heat or cooling source is directly applied to the reaction vessel. Accordingly, the terms "room temperature" and "ambient temperature" encompass the individual temperatures and any and all ranges, subranges, and combinations of subranges of temperatures from 15° C. to 40° C. wherein no external heating or cooling source is directly applied to the reaction vessel.

The terms "atmospheric pressure" or "ambient pressure" as used herein to describe an earth air pressure wherein no external pressure modifying means is utilized. Generally, unless practiced at extreme earth altitudes, "atmospheric pressure" or "ambient pressure" is about 1 atmosphere (alternatively, about 14.7 psi or about 101 kPa).

The term "contacting" is used herein to describe systems, compositions, processes, and methods in which the components are contacted, combined, added, or brought together in any order, in any manner, and for any length of time, unless otherwise specified. For example, the components can be combined by blending or mixing, using any suitable technique.

The term "about" means that amounts, sizes, formulations, parameters, and other quantities and characteristics are not and need not be exact, but may be approximate including being larger or smaller, as desired, reflecting tolerances, conversion factors, rounding off, measurement errors, and the like, and other factors known to those of skill in the art. In general, an amount, size, formulation, parameter or other quantity or characteristic is "about" or "approximate" whether or not expressly stated to be such. The term "about" also encompasses amounts that differ due to different equilibrium conditions for a composition resulting from a particular initial mixture. Whether or not modified by the term "about," the claims include equivalents to the quantities.

Various numerical ranges are disclosed herein. When a range of any type is disclosed or claimed herein (e.g., "ranging from . . . ", "in the range of from . . . ", "in a range of from") the intent is to disclose or claim individually each possible number that such a range could reasonably encompass, including end points of the range as well as any sub-ranges and combinations of sub-ranges encompassed therein, unless otherwise specified. For example, the present disclosure recites that the process reaction conditions in the acid leaching step can comprise a temperature in a range from 20° C. to about 110° C. in certain aspects. By a disclosure that the temperature can be in a range from about 20° C. to about 110° C., the intent is to recite that the temperature can be any temperature within the range and, for example, can be equal to about 20° C., about 25° C., about 30° C., about 35° C., about 40° C., about 45° C., about 50° C., about 55° C., 60° C., about 65° C., about 70° C., about 75° C., about 80° C., about 85° C., about 90° C., about 95° C., about 100° C., about 105° C., or about 110° C. Additionally, the temperature can be within any range from about 20° C. to about 110° C. (for example, the temperature can be in a range from about 70° C. to about 90° C.), and this also includes any combination of ranges between about 20° C. and about 110° C. Likewise, all other ranges disclosed herein should be interpreted in a manner similar to this example.

Embodiments disclosed herein can provide the materials listed as suitable for satisfying a particular feature of the embodiment delimited by the term "or." For example, a particular feature of the disclosed subject matter can be disclosed as follows: Feature X can be A, B, or C. It is also contemplated that for each feature the statement can also be phrased as a listing of alternatives such that the statement "Feature X is A, alternatively B, or alternatively C" is also an embodiment of the present disclosure whether or not the statement is explicitly recited.

Although any methods and materials similar or equivalent to those described herein can be used in the practice or testing of the subject matter described herein, the typical methods and materials are herein described.

All publications and patents mentioned herein are incorporated herein by reference for the purpose of describing and disclosing, for example, the constructs and methodologies that are described in the publications, which can be used in connection with the presently described subject matter.

DETAILED DESCRIPTION

Illustrative aspects of the subject matter claimed below will now be disclosed. In the interest of clarity, not all features of an actual implementation are described in this specification. It will be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

The present disclosure is generally directed to one or more processes for extracting one or more metals from spent lithium ion batteries (LIBs). The LIBs may be processed so as to form a black mass (e.g., by shredding the LIBs), which facilitates more efficient extraction of the one or more metals from the LIBs.

LIBs generally comprise a cathode comprising cathode active material (CAM), and an anode comprising graphite. The CAM comprises one or more metals selected from the group consisting of lithium, cobalt, nickel, manganese, and any combination of two or more of the foregoing. The LIBs may also comprise one or more other components selected from the group consisting of iron, aluminum, copper, phosphorus, graphite, plastics, and any combination of two or more of the foregoing. Thus, in an aspect, the black mass comprises the CAM and the one or more other components.

A. Acid Leaching

In an aspect, the process comprises preparing a combination comprising the one or more metals, a liquid, an acid, and one or more other components. The one or more metals and one or more other components may be derived from the LIBs as described above.

As illustrated in FIG. 1, the combination may be prepared by contacting the black mass with an acid and a liquid solvent, for example, an aqueous acid solution comprising the acid and water. Mixing the black mass with the acid can generate hydrogen gas due to the certain impurities (e.g., aluminum and iron) that may be present in the black mass. Therefore, to avoid or reduce foam formation, the black mass is preferably first contacted with the acid, without additional heating. Once hydrogen gas formation is substantially completed, as evidenced by no visible foam and/or bubbles, the combination is contacted with a reducing agent comprising sodium thiosulfate ($Na_2S_2O_3$) under conditions sufficient so as to form an acid leachate. The reducing agent may be an aqueous solution. By way of this process, the one or more metals of the CAM (e.g., lithium, cobalt, nickel, and/or manganese) are released into the acid leachate along with any iron and/or aluminum, while copper and phosphorous remain in their solid forms.

The acid and the reducing agent are present in an amount sufficient to minimize water consumption while keeping all soluble salts within their solubility limits. Thus, in an aspect, the acid is present in an amount ranging from about 0.1 wt. % to about 55 wt. %, based on the total weight of the acid solution. The acid may be present in an amount ranging from about 20 wt. % to about 40 wt. %, based on the total weight of the acid solution. The acid may be present in an amount of about 25 wt. %, based on the total weight of the acid solution. The acid comprises one or more selected from the group consisting of sulfuric acid, hydrochloric acid, and nitric acid.

In an aspect, the reducing agent is present in an amount ranging from about 0.1 wt. % to about 100 wt. %, based on the total weight of the reducing agent solution. The reducing agent may be present in an amount ranging from about 5 wt. % to about 50 wt. %, based on the total weight of the reducing agent solution. The reducing agent may be present in an amount of about 40 wt. %, based on the total weight of the reducing agent solution.

As an illustrative example, for a black mass comprising lithium cobalt oxide ($LiCoO_2$), the acid leaching reaction may proceed according to the following:

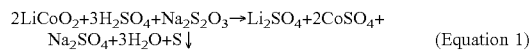

$$2LiCoO_2 + 3H_2SO_4 + Na_2S_2O_3 \rightarrow Li_2SO_4 + 2CoSO_4 + Na_2SO_4 + 3H_2O + S\downarrow \quad \text{(Equation 1)}$$

In practice, because several differing types of LIBs are generally collected and processed together, the resulting acid leachate comprises one or more selected from the group consisting of $Li_2SO_4$, $CoSO_4$, $NiSO_4$, $MnSO_4$, $Na_2SO_4$, and any combination of two or more of the foregoing. In Equation 1, the thiosulfate anion, containing sulfur with +5 and −2 charges (or +6 and −1), serves substantially only as a reducing agent. Once oxidized, the thiosulfate anion forms sulfate anion and elemental sulfur.

The combination is preferably contacted with the reducing agent under conditions sufficient so as to complete or substantially complete the reaction in a reasonable amount of time, for example, by heating and/or agitating the mixture of the combination and the reducing agent. Thus, in an aspect, the process may further comprise heating or raising the temperature of the mixture of the combination and the reducing agent to a temperature of in the range of from about 20° C. to about 110° C. The temperature may be in the range of from about 60° C. to about 95° C. The temperature may be at least about 90° C.

Although the temperature of the mixture of the combination and the reducing agent in the acid leaching step can be in a wide range as described above, if the acid comprises sulfuric acid ($H_2SO_4$) and the reducing agent is sodium thiosulfate ($Na_2S_2O_3$), it has been found that a temperature of at least about 90° C. (e.g., in a range of from 90° C. to about 110° C.) is particularly optimal because such a temperature is believed to promote a side reaction between excessive sulfuric acid ($H_2SO_4$) and sodium thiosulfate ($Na_2S_2O_3$), and in this aspect substantially no elemental sulfur is expected to form after filtration.

In an aspect, the process comprises contacting the combination with the reducing agent for a period in the range of from about 0.5 hours to about 18 hours. The period may be in the range of from about 1 hours to about 6 hours. The period may about 3 hours.

In an aspect, the process comprises contacting the combination with the reducing agent at a pressure that is about atmospheric pressure.

In the above reaction illustrated by Equation 1, it has been found that no or substantially no copper (Cu) or phosphorus (P) can be detected in the resulting acid leachate. It is believed that other trace amount metal impurities may also be affected in the above reaction, for example, it has been found that in the above reaction no or substantially no tin (Sn) or titanium (Ti) can be detected in in the acid leachate.

B. pH Adjustment

The process also comprises contacting the acid leachate with a base adapted to adjust the pH of the acid leachate so as to form a precipitate comprising aluminum (e.g., one or more compounds comprising aluminum) and eliminate most (i.e., ≥90%) of the dissolved aluminum ($Al^{3+}$) from the acid leachate. For example, the acid leachate may be contacted with a base solution comprising lithium hydroxide (LiOH) under conditions sufficient so as to form a precipitate comprising aluminum hydroxide ($Al(OH)_3$).

In an aspect, the pH of the acid leachate is a value ranging from about 2 to about 8. The pH of the acid leachate may be a value ranging from about 3.5 to about 4.5. The pH of the acid leachate may be a value of about 4.0. By using the above pH, it has been found that above pH of about 8, the loss of Co, Ni and Mn becomes significant; and below pH of about 2, no aluminum (Al) can be precipitated and removed.

In an aspect, the base is present in an amount ranging from about 1 wt. % to about 100 wt. %, based on the total weight of the base solution. The base may be present in an amount ranging from about 1 wt. % to about 50 wt. %, based on the total weight of the base solution. The base may be present in an amount of about 10 wt. %, based on the total weight of the base solution. The base comprises one or more selected from the group consisting of lithium hydroxide, sodium hydroxide, potassium hydroxide, and any combination of two or more of the foregoing.

In an aspect, the temperature of the acid leachate during the pH adjustment step is a temperature of in the range of from about 20° C. to about 110° C. The temperature may be in the range of from about 60° C. to about 95° C. The temperature may be at least about 90° C.

Although the temperature of the acid leachate during the pH adjustment step may be in a wide range as described above, a temperature of at least about 90° C. (e.g., in a range of from 90° C. to about 110° C.) is optimal because it can increase the efficiency of aluminum removal from the acid leachate and the filterability of $Al(OH)_3$ precipitate. For example, in comparison with the pH adjustment under room temperature, the aluminum-removal efficiency increases from 60% to 90% when conducted at 90° C. and above. In addition, under ambient conditions (i.e., ambient temperature and ambient pressure), aluminum hydroxide ($Al(OH)_3$) tends to form as a gel, which does not tend to occur when heating (≥90° C.) is applied.

After the pH adjustment step, the process may comprise separating solids from the acid leachate. For example, following the pH adjustment step, solid waste may be separated from the acid leachate by filtration. The solid/liquid separation results in removal of solids from the acid leachate thereby resulting in the acid leachate being a Li/Co-rich solution. The solids may comprise one or more selected from the group consisting of graphite, plastics, copper, one or more aluminum containing compounds, one or more iron containing compounds, one or more phosphorous containing compounds, and any combination of one or more of the foregoing. An example of an aluminum containing compound includes without limitation aluminum hydroxide ($Al(OH)_3$). Examples of iron containing compounds include without limitation iron phosphate ($FePO_4$) and iron(III) hydroxide ($Fe(OH)_3$).

C. Removal of Iron and Manganese

Because sodium thiosulfate ($Na_2S_2O_3$) is a reducing agent, substantially all iron from the acid leaching step may remain in the acid leachate as Fe(II) along with other metals, some of which can be transition metals (e.g., cobalt, nickel and manganese). The redox potentials of the involved metal ion pairs generally the trend shown below:

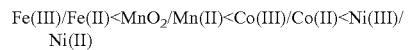

Fe(III)/Fe(II)<$MnO_2$/Mn(II)<Co(III)/Co(II)<Ni(III)/Ni(II)

Accordingly, Fe(II) and Mn(II) can be selectively oxidized, precipitated and removed from the acid leachate. Thus, the process comprises contacting the acid leachate with an oxidizing agent. Examples of suitable oxidizing agents include without limitation one or more selected from the group consisting of salts of permanganate anion ($MnO_4^-$), ozone, nitric acid, concentrated sulfuric acid (e.g., greater than about 95 wt. %), halogens, perchlorate, chlorite, and any combination of two or more of the foregoing. For the purpose of purification and Fe(II) and Mn(II) removal, salts of permanganate are suitable options. Examples of salts of permanganate include without limitation one or more selected from the group consisting of sodium permanganate ($NaMnO_4$), potassium permanganate ($KMnO_4$), any combination of two or more of the foregoing.

For example, an aqueous solution of the stoichiometric amount of the salt of permanganate may be added during agitation to the Li/Co-rich acid leachate resulting from the separation of insoluble solids from the acid leachate, thereby resulting in dark brown solids forming almost instantly. In an aspect, the salt of permanganate is present in an amount ranging from about 1 wt. % to about 100 wt. %, based on the total weight of the permanganate solution. The salt of the permanganate may be present in an amount of about 10 wt. %, based on the total weight of the permanganate solution.

The following reactions are representative for where the oxidizing agent is sodium permanganate (NaMnO$_4$):

$$2NaMnO_4+10FeSO_4+8H_2SO_4 \rightarrow 2MnSO_4+ \\ 5Fe_2(SO_4)_3+Na_2SO_4+8H_2O \quad \text{(Equation 2)}$$

and $$2NaMnO_4+3MnSO_4+2H_2O \rightarrow 5MnO_2\downarrow +Na_2SO_4+ \\ 2H_2SO_4 \quad \text{(Equation 3)}$$

Once Fe(II) is oxidized and converted to Fe(III), it can be precipitated from the acid leachate as Fe(OH)$_3$ at pH of less than about 3, as will be familiar to those skilled in the art.

Figure 2:
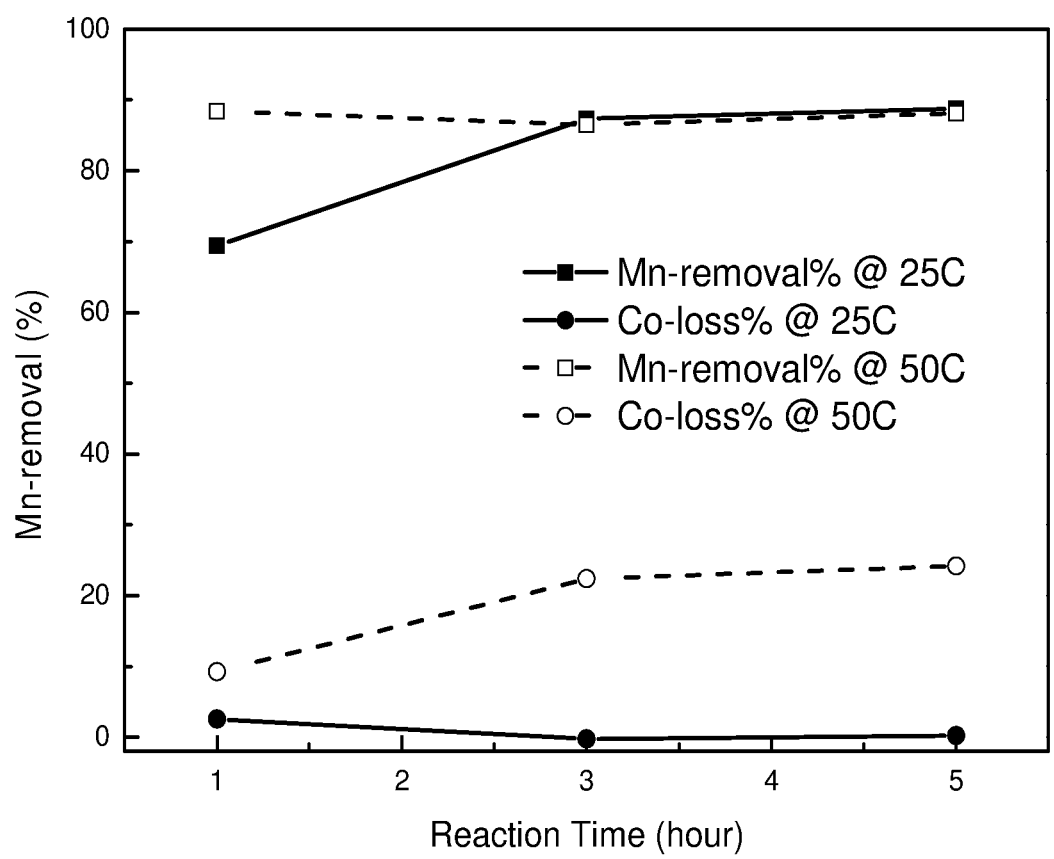
FIG. 2 illustrates a graph showing lower cobalt (Co) loss under 50° C. (as compared to Co loss above 50° C.) during the oxidation of $Mn^{2+}/Fe^{2+}$ in accordance with certain aspects of the present disclosure.

In an aspect, this step is conducted at ambient temperature to decrease the loss of cobalt as compared to if the method were conducted at temperatures higher than ambient temperature. This is because the higher redox potential of Co$^{3+}$/Co$^{2+}$ can be overcome by an elevated temperature that is greater than ambient temperature, as is evidenced by FIG. 2, which illustrates higher Co loss at 50° C. (as compared to Co loss at 20° C.). It has been found that when this reaction step is conducted for a period in the range of from about 3 hours to about 5 hours under ambient conditions (i.e., ambient temperature and ambient pressure), removal efficiency is about 20% higher than if conducted for about 1 hour under the same conditions. Thus, in an aspect, this step is conducted at room temperature for a period in the range of about 3 to about 5 hours of residence time, which can result in about 100% removal of Fe and 85% of Mn can be removed as MnO$_2$.

Because the formation of MnO$_2$ generates acid, a base solution, such as LiOH or NaOH, may be used to increase the pH to about 3.5 to about 4 to help ensure that substantially all Fe(III) is precipitated from the acid leachate along with MnO$_2$.

The amount of the permanganate consumed is not generally predictable based on only the incoming quantity of Mn in the black mass. In addition to the reactions described above, any remaining sodium thiosulfate may be oxidized according to the following:

$$8NaMnO_4+3Na_2S_2O_3+H_2SO_4 \rightarrow 8MnO_2+7Na_2SO_4+ \\ H_2O \quad \text{(Equation 4)}$$

Figure 3:
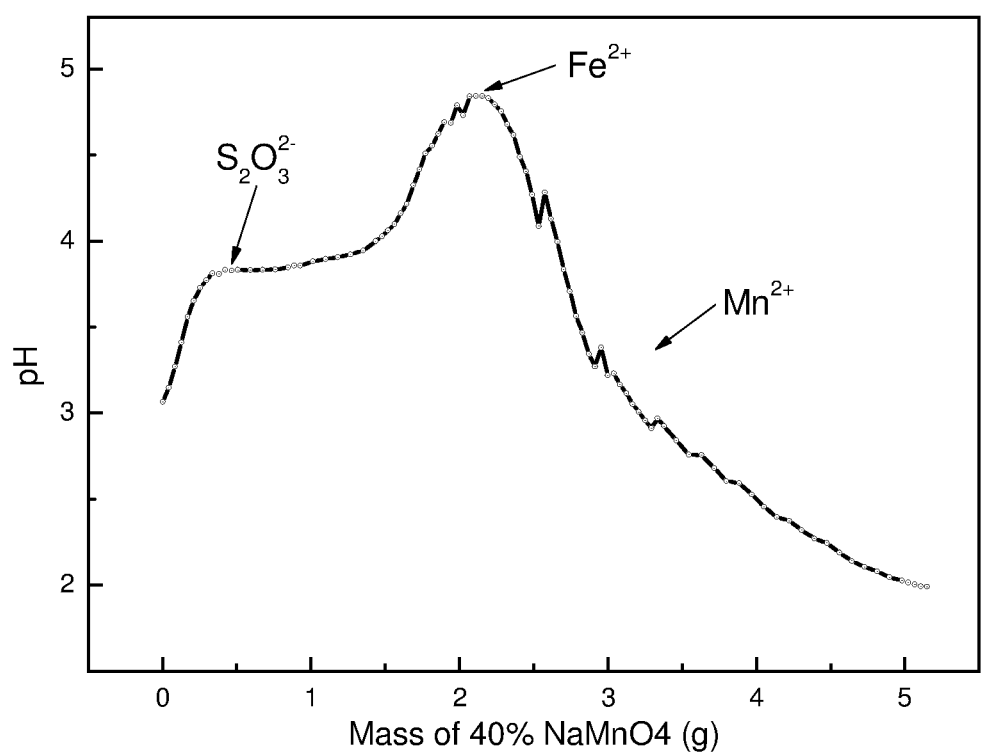
FIG. 3 illustrates a graph showing pH changes during the course of the oxidation of $Mn^{2+}/Fe^{2+}$ in certain leachates with different metal compositions in accordance with certain aspects of the present disclosure.

With these impurities (i.e., thiosulfate and iron ions) present in the acid leachate, the pH curve plotted against the amount of permanganate added shows the redox reactions in the sequence of S$_2$O$_3^{2-}$, Fe$^{2+}$ then Mn$^{2+}$, as illustrated in FIG. 3. Oxidation of the first two ions causes the pH to increase while that of Mn$^{2+}$ lowers the pH. Therefore, regardless of the quantities of these ions, this step can be controlled by monitoring the pH until it levels off, as evidenced by a pH change of about ±0.02 upon the addition of permanganate.

Following the above, an acid leachate is obtained that is a solution rich in lithium (Li), cobalt (Co) and nickel (Ni), which is ready for one or more additional separation and/or extraction processes.

D. Solvent Extraction

Following the steps of A to C, the acid leachate comprises cobalt, nickel and lithium. Due to their very similar physical and chemical properties, cobalt and nickel can be challenging to separate. Therefore, cobalt and nickel often coexist in natural resources and solvent extraction is a widely accepted method for the separation of these two.

Thus, in an aspect, the process comprises contacting the acid leachate with a solvent adapted to extract cobalt from the acid leachate so as to form an organic/aqueous mixture. The solvent extraction process comprises separating Co from Ni aqueous solution (i.e., extracting), removing impurities co-extracted along with Co (i.e. scrubbing), and generating Co aqueous solution and regenerating the organics (i.e., stripping).

CYANEX® 272, a commercially available solvent by Solvay®, may be used for extracting cobalt from a nickel solution. However, CYANEX® 272 is not very selective as for Co among copper, aluminum, iron and phosphorous. This is one reason why sodium thiosulfate is used at the beginning of the acid leaching step. Once these impurities (i.e., Cu, Al, Fe and/or P) are removed from or reduced in the acid leachate, the separation of Co and Ni from the acid leachate is generally fairly straightforward. Because the solvent, CYANEX® 272, is capable of being regenerated and reused, overall there is nearly no loss of cobalt, nickel and lithium, and the costs associated with the solvent are also minimal.

The active component in CYANEX® 272 contains a phosphinic-acid (e.g., dialkyl phosphinic acid), from which protons are released to exchange with the extracted ions as shown in the following:

$$2(H-CYANEX® \ 272)+Co^{2+} \leftrightarrow Co(-CYANEX® \ 272)_2+2H+ \quad \text{(Equation 5)}$$

Because the extraction selectivity is dependent on the pH of the aqueous phase, continuous addition of a base, such as a base solution comprising lithium hydroxide (LiOH), is used to maintain a desired pH during the entire extraction step. In an aspect, the pH is in the range of from about 4.0 to about 5.5. The pH may be in the range of from about 5 to about 5.5.

The pH may be about 5.

In an aspect, during extracting, the organic solvent is a solution comprising CYANEX® 272 in kerosene. Depending on the amount of cobalt to be extracted, various concentrations of CYANEX® 272 and various volume ratios of organic to aqueous phases (O/A) may be used, as should be familiar to those of skill in the art in view of the present disclosure. For example, for an acid leachate solution comprising 2 wt. % to 5 wt. % Co, about 0.5 M to about 1 M (i.e., about 17 wt. % to about 35 wt. %) CYANEX® 272 with initial O/A ranging from about 2 to about 6 may be used. A 5 wt. % Co solution is typically generated from LCO-type LIBs. During this time, an alkaline base, such as a alkaline solution comprising LiOH and/or NaOH, is added to the organic/aqueous mixture continuously to maintain pH in the range of about 5 to about 5.5.

In an aspect, the organic phase of the organic aqueous mixture may be scrubbed to remove impurities co-extracted along with Co. For example, the organic phase of the aqueous mixture, which contains cobalt, also extracts a small amount of other metal cations such as Li$^+$, Na$^+$, Mn$^{2+}$ and Ni$^{2+}$. This scrubbing step uses a 3 wt. % to 6 wt. % Co solution, based on the total weigh of the Co solution, with pH 4-5 and O/A=1-2 to contact the organic phase of the aqueous mixture. The Co$^{2+}$ from the scrubbing solution replaces the loosely bonded Li$^+$, Na$^+$ and Ni$^{2+}$, as well as a 30% to 80% of extracted Mn$^{2+}$. which has higher affinity to the organics than Co$^{2+}$.

Stripping is the reverse reaction of extraction. Thus, in an aspect, the Co-loaded organics (i.e., the organic phase after extracting cobalt from the acid leachate and then scrubbing by contacting with the 3 wt. % to 6 wt. % Co solution) is contacted with an acid solution (e.g., H$_2$SO$_4$), and the protons replace and release Co$^{2+}$ to the aqueous phase. For example, 1-4 M H$_2$SO$_4$ solution with O/A=1-8 can completely release the loaded Co$^{2+}$ from the Co-loaded organics.

E. Separation Steps

Following the solvent extraction, two aqueous streams are typically generated: (1) a purified Co-rich solution, and (2) a Ni/Li/Na solution.

The Co-rich solution may be processed through a crystallization process to produce a Co salt product, such as cobalt sulfate heptahydrate ($CoSO_4 \cdot 7H_2O$), and/or it can be precipitated as various salts such as $Co(OH)_2$, $CoCO_3$ and CoS. The Co-rich solution may also be processed to produce other Co containing products such as, for example, cobalt chloride and cobalt nitrate.

Nickel may be separated from the Ni/Li/Na solution to generate a Li/Na solution. One approach is to increase the pH of the Ni/Li/Na solution so that is in the range of from about 10 to about 11, where substantially all Ni can be precipitated from the Ni/Li/Na solution as nickel hydroxide ($Ni(OH)_2$). Other Ni products that can be made include one or more selected from the group consisting of nickel sulfide, nickel oxalate, nickel carbonate, nickel phosphate, and any combination of two or more of the foregoing. The thus generated Li/Na solution can then be processed to make one or more lithium containing compounds, for example, one or more selected from the group consisting of lithium hydroxide, lithium carbonate, lithium phosphate, lithium sulfate, lithium chloride, lithium nitrate, and any combination of two or more of the foregoing. As one of skill in the art appreciates, process conditions can vary depending on the solubility of the particular lithium compounds.

FIG. 1 illustrates the lithium containing product as lithium hydroxide monohydrate. In this case, the lithium hydroxide concentrate solution from the $LiOH \cdot H_2O$ crystallization step can be recycled in-process as the alkaline solution consumed for all the pH adjustment needs of the processes described herein.

F. Alternatives

Alternatively following steps A. and B., the remaining metals (i.e., Co, Ni, Mn, with other impurities such as Fe and Al) can be precipitated altogether by increasing pH of the acid leachate solution to a pH greater than about 10, or more preferably a pH greater than about 11.

By increasing the pH in this manner, a Co/Ni concentrate solid will form as an intermediate product for subsequent Co/Ni separation, and a purified lithium stream to produce various Li products such as lithium hydroxide, lithium carbonate or lithium phosphate.

EXAMPLES

To facilitate a better understanding of the present disclosure, the following examples of embodiments are provided. In no way should the following examples be read to limit, or to define, the scope of the appended claims.

Example 1. Acid Leaching with Sodium Thiosulfate 20 g of a black mass sample was mixed with 60 g of 25% $H_2SO_4$ solution, to which 10 g 40% $Na_2S_2O_3$ solution was added. This mixture was heated at 90° C. for 3 hours before vacuum filtration was conducted. The resulting acid leachate contained the ions shown below in Table 1.

TABLE 1

| Elements | Contents (ppm) |
|---|---|
| Al | 3050 |
| Co | 44280 |

TABLE 1-continued

| Elements | Contents (ppm) |
|---|---|
| Cu | Not detectable |
| Fe | 166 |
| Li | 7950 |
| Mn | 3723 |
| Ni | 4578 |
| Na | 11430 |
| P | Not detectable |
| Sn | Not detectable |
| Ti | Not detectable |

Example 2. Acid Leaching with $H_2O_2$ for Comparison with Example 1

100 g of the same black mass sample as was used in Example 1 was mixed with 300 g of 35% $H_2SO_4$ solution, to which 30.5 g 50% $H_2O_2$ solution was added. This mixture was heated at 90° C. for 3 hours before vacuum filtration was conducted. The resulting acid leachate contained the ions listed in Table 2.

TABLE 2

| Elements | Contents (ppm) |
|---|---|
| Al | 3654 |
| Co | 39750 |
| Cu | 7578 |
| Fe | 284 |
| Li | 6957 |
| Mn | 3051 |
| Ni | 4111 |
| Na | 90 |
| P | 8148 |
| Sn | 47 |
| Ti | 36 |

Example 3. pH Adjustment for Al Removal

An acid leachate or slurry generated under the same conditions as described in Example 1 had a pH value of 2.0. To the acid leachate and at the temperature of 90° C., 10% LiOH solution was added to increase the pH to a value of 3.52. 90% of Al was removed from the acid leachate and was filtered off along with the other solid wastes generated from the acid leaching step.

Example 4. Generation of Co/Ni Concentrate

10% LiOH solution was added to two acid leachate samples prepared from two black mass materials with the above methods, until the pH reached a value of 11. Thus generated Co/Ni concentrate solids have the compositions given in Table 3.

TABLE 3

|  | Units | Al | Co | Cu | Fe | Mn | Ni | P |
|---|---|---|---|---|---|---|---|---|
| Black Mass 1 | wt. % | 2.6% | 9.5% | 2.2% | 1.6% | 2.8% | 2.8% | 2.4% |
| Co/Ni Concentrate 1 | wt. % | 3.0% | 24% | 0.0% | 2.9% | 6.6% | 6.9% | 0.0% |
| Black Mass 2 | wt. % | 2.3% | 20% | 5.6% | 0.1% | 0.7% | 1.5% | 2.6% |
| Co/Ni Concentrate 2 | wt. % | 3.0% | 37% | 0.0% | 0.4% | 2.2% | 1.9% | 0.0% |

Example 5. Iron and Manganese Removal

To 100.00 g of an acid leachate sample, 40% NaMnO$_4$ solution was added while the pH of thus generated slurry was monitored and recorded, until it started to decrease and eventually showed no change with additional permanganate. A total of 5.15 g 40% NaMnO$_4$ was consumed. After 3 hours of agitation under ambient conditions, the pH of the resulting slurry stabilized at 1.86. 3.36 g of 10% LiOH was added to increase the pH to 3.51 before vacuum filtration was performed. The compositions of the acid leachate before and after the Fe/Mn-removal are shown in Table 4.

TABLE 4

| | Contents | |
|---|---|---|
| Elements | Before (ppm) | After (ppm) |
| Co | 20640 | 23000 |
| Fe | 3608 | Not detectable |
| Li | 3004 | 4003 |
| Mn | 2958 | 352 |
| Ni | 4296 | 4463 |

Example 6. Solvent Extraction

An acid leachate solution, generated from the acid leaching, pH adjustment, Fe/Mn removal steps, is used for the solvent extraction. First, 96 g of such acid leachate solution is vigorously agitated with 386 g of 0.5 M CYANEX® 272 solution (O/A=5) for 30 minutes. Simultaneously, 2.4 wt. % LiOH solution was slowly pumped into the mixture of acid leachate solution and CYANEX® 272 solution to maintain the pH at 5.3 through the entire time. 100% of Co, 96% of Mn and 100% Al were extracted. Once the extraction was completed, the Co-loaded organic phase was separated from the aqueous phase. Second, a 6% Co solution (pH=4) was agitated with the Co-loaded organics (O/A=1) for 30 minutes for scrubbing off the co-extracted metals such as Li and Na as well as 77 wt. % of Mn. The scrubbed organic phase was again separated from the aqueous phase. Last, 4 M solution of H$_2$SO$_4$ was agitated with the resulting organic phase from the above steps (O/A=8) for 30 minutes. The composition of the final Co stream is given in Table 5.

TABLE 5

| | Contents | |
|---|---|---|
| Elements | Leachate (ppm) | Product (ppm) |
| Al | 393 | 493 |
| Co | 19890 | 145600 |
| Li | 6759 | Not detectable |
| Mn | 2791 | 2008 |
| Na | 14430 | Not detectable |
| Ni | 4169 | Not detectable |

The subject matter is described above with reference to numerous aspects and specific examples. Many variations will suggest themselves to those skilled in the art in light of the above detailed description. All such obvious variations are within the full intended scope of the appended claims. Other aspects of the subject matter disclosed herein can include, but are not limited to, the following (aspects are described as "comprising" but, alternatively, can "consist essentially of", or "consist of"):

Aspect 1. A process for extracting one or more metals from a combination comprising the one or more metals, a liquid, an acid, and one or more other components, wherein the process comprises
 (A) adding a reducing agent to the combination, wherein the reducing agent is adapted to reduce a substantial portion of the one or more metals and to have no substantial effect on the one or more other components; and
 (B) adjusting the pH of the combination so as to form a precipitate comprising aluminum.

Aspect 2. The process defined in Aspect 1, wherein the reducing agent comprises sodium thiosulfate.

Aspect 3. The process defined in any one of Aspects 1-2 and 6, wherein the pH is in the range of from about 2 to about 8.

Aspect 4. The process defined in any one of Aspects 1-3 and 6, wherein the pH is in the range of from about 3.5 to about 4.5.

Aspect 5. A process comprising:
 (A) extracting one or more metals from a combination comprising said one or more metals, a liquid, an acid, and one or more other components, wherein the one or more metals and one or more other components are derived from one or more spent lithium ion batteries and the extracting comprises adding a reducing agent comprising sodium thiosulfate to the combination, wherein the reducing agent is adapted to reduce a substantial portion of the one or more metals and to have no substantial effect on the one or more other components, thus producing a leachate comprising Fe(II) and Mn(II); and
 (B) removing the Fe(II) and the Mn(II) from the leachate by adding an oxidizing agent to the leachate, wherein the oxidizing agent comprises one or more salts of permanganate anion (MnO$_4^-$), ozone, nitric acid, sulfuric acid, a halogen, perchlorate, or chlorite.

Aspect 6. A process comprising:
 (A) preparing a mass from one or more lithium ion batteries, wherein the mass comprises one or more selected from the group consisting of lithium, cobalt, nickel, manganese, iron, aluminum, and any combination of two or more of the foregoing;
 (B) contacting the mass with an acid to form a combination;
 (C) contacting the combination with a reducing agent so as to form an acid leachate, wherein the reducing agent comprises sodium thiosulfate;
 (D) adjusting the pH of the acid leachate so as to form a precipitate comprising aluminum; and
 (E) separating and/or extracting from the acid leachate one or more selected from the group consisting of lithium, cobalt, nickel, manganese, iron, aluminum, and any combination of two or more of the foregoing.

Aspect 7. The process defined in Aspect 6, wherein in step (D) the pH is in the range of from about 2 to about 8.

Aspect 8. The process defined in any one of Aspects 6-7, wherein in step (D) the pH of the acid leachate is in the range of from about 3.5 to about 4.5.

Aspect 9. The process defined in any one of Aspects 6-8, wherein one or more compounds comprising aluminum are extracted from the acid leachate by filtration.

Aspect 10. The process defined in any one of Aspects 6-9, further comprising removing Fe(II) and Mn(II) from the acid leachate by contacting the acid leachate with an oxidizing agent.

Aspect 11. The process defined in any one of Aspects 6-10, wherein the oxidizing agent comprises one or more selected from the group consisting of salts of permanganate anion ($MnO_4^-$), ozone, nitric acid, sulfuric acid, a halogen, perchlorate, chlorite, and any combination of two or more of the foregoing.

Aspect 12. The process defined in any one of Aspects 6-11, wherein lithium is extracted from the acid leachate as one or more selected from the group consisting of lithium hydroxide, lithium carbonate, lithium phosphate, lithium sulfate, lithium chloride, lithium nitrate and any combination of two or more of the foregoing.

Aspect 13. The process defined in any one of Aspects 6-12, wherein cobalt is extracted from the acid leachate as one selected from the group consisting of cobalt sulfate, cobalt chloride, cobalt nitrate, and any combination of two or more of the foregoing.

What is claimed is:

1. A process for extracting one or more metals from a combination comprising the one or more metals, a liquid, an acid, and one or more other components, wherein the process comprises:
   (A) adding a reducing agent to the combination, wherein the reducing agent is adapted to reduce at least a portion of the one or more metals and does not remove the one or more other components, thus producing a leachate comprising Fe(II) and Mn(II);
   (B) adjusting the pH of the combination so as to form a precipitate comprising aluminum; and
   (C) selectively oxidizing, precipitating, and removing the Fe(II) and the Mn(II) from the leachate simultaneously, while any remaining metals remain in the leachate, by adding an oxidizing agent to the leachate, wherein the oxidizing agent comprises ozone, nitric acid, sulfuric acid, perchlorate, chlorite, or one or more salts of permanganate anion ($MnO_4$).

2. A process according to claim 1, wherein the reducing agent comprises sodium thiosulfate.

3. A process according to claim 2, wherein in step (B) the pH is in the range of from about 2 to about 8.

4. A process according to claim 2, wherein in step (B) the pH is in the range of from about 3.5 to about 4.5.

5. A process comprising:
   (A) extracting one or more metals from a combination comprising said one or more metals, a liquid, an acid, and one or more other components, wherein the one or more metals and one or more other components are derived from one or more spent lithium ion batteries and the extracting comprises adding a reducing agent comprising sodium thiosulfate to the combination, wherein the reducing agent is adapted to reduce a substantial portion of the one or more metals and to have no substantial effect on the one or more other components, thus producing a leachate comprising Fe(II) and Mn(II); and
   (B) simultaneously removing the Fe(II) and the Mn(II) from the leachate, while any remaining metals remain in the leachate, by adding an oxidizing agent to the leachate, wherein the oxidizing agent comprises one or more salts of permanganate anion ($MnO_4^-$), ozone, nitric acid, sulfuric acid, perchlorate, or chlorite.

* * * * *